April 23, 1946.  W. L. MOORE  2,398,951
VEHICLE WHEEL
Filed Feb. 13, 1943  3 Sheets—Sheet 1
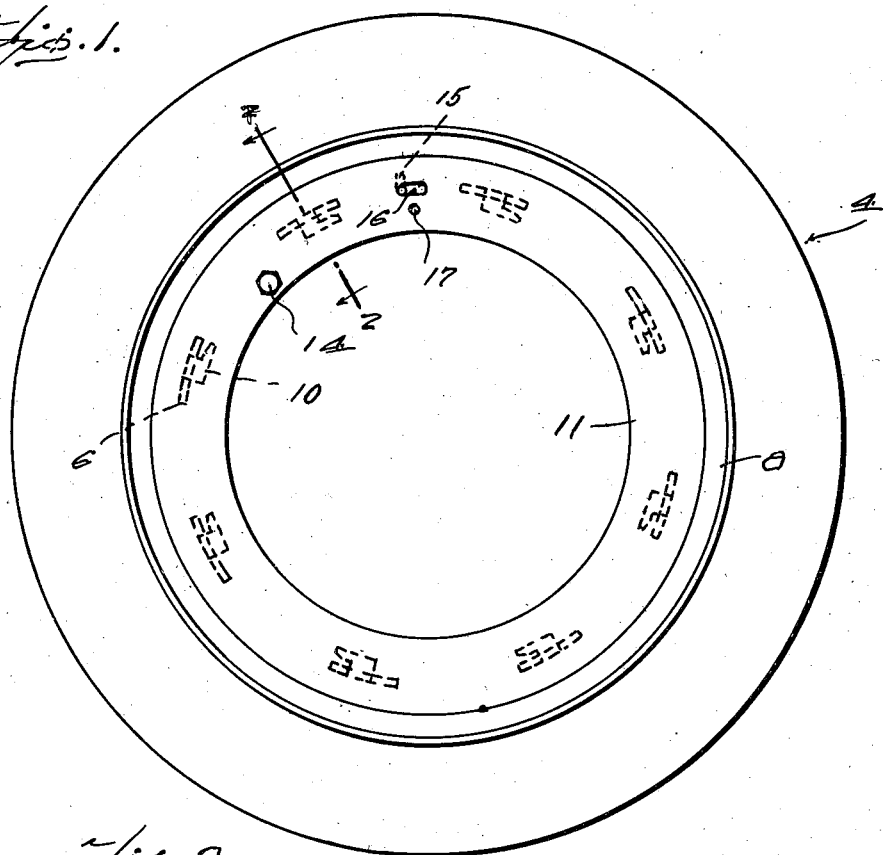
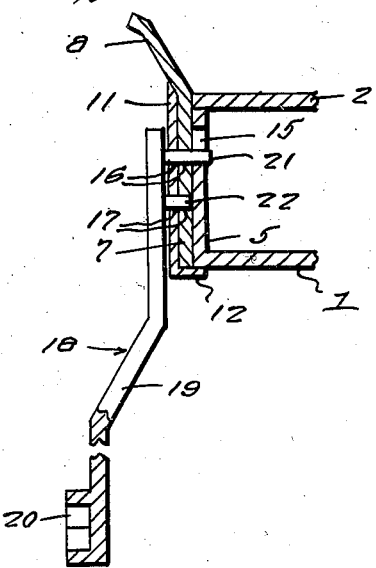
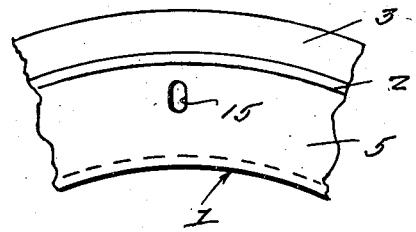
Inventor
Warren Lee Moore
By Clarence A. O'Brien
and Harvey B. Jacobson
Attorneys April 23, 1946.  W. L. MOORE  2,398,951
VEHICLE WHEEL
Filed Feb. 13, 1943  3 Sheets-Sheet 2
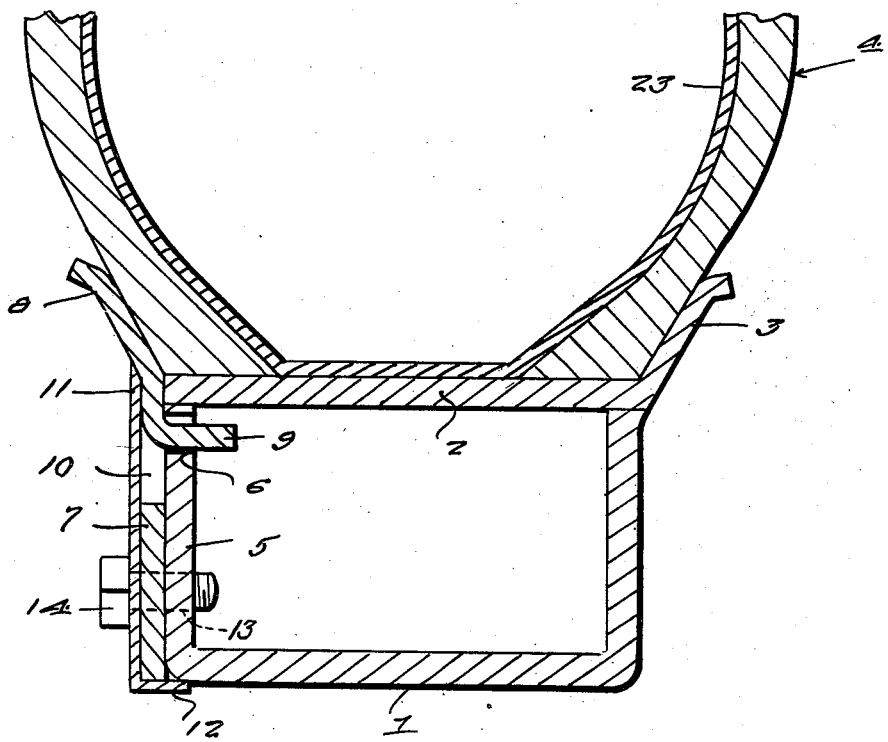
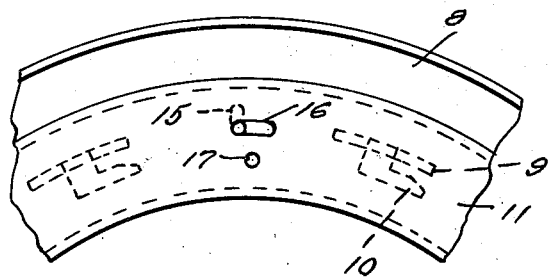
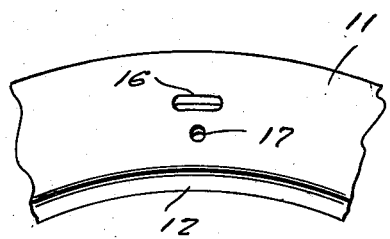
Inventor
Warren Lee Moore
By Clarence A. O'Brien
and Harvey B. Jacobson
Attorneys

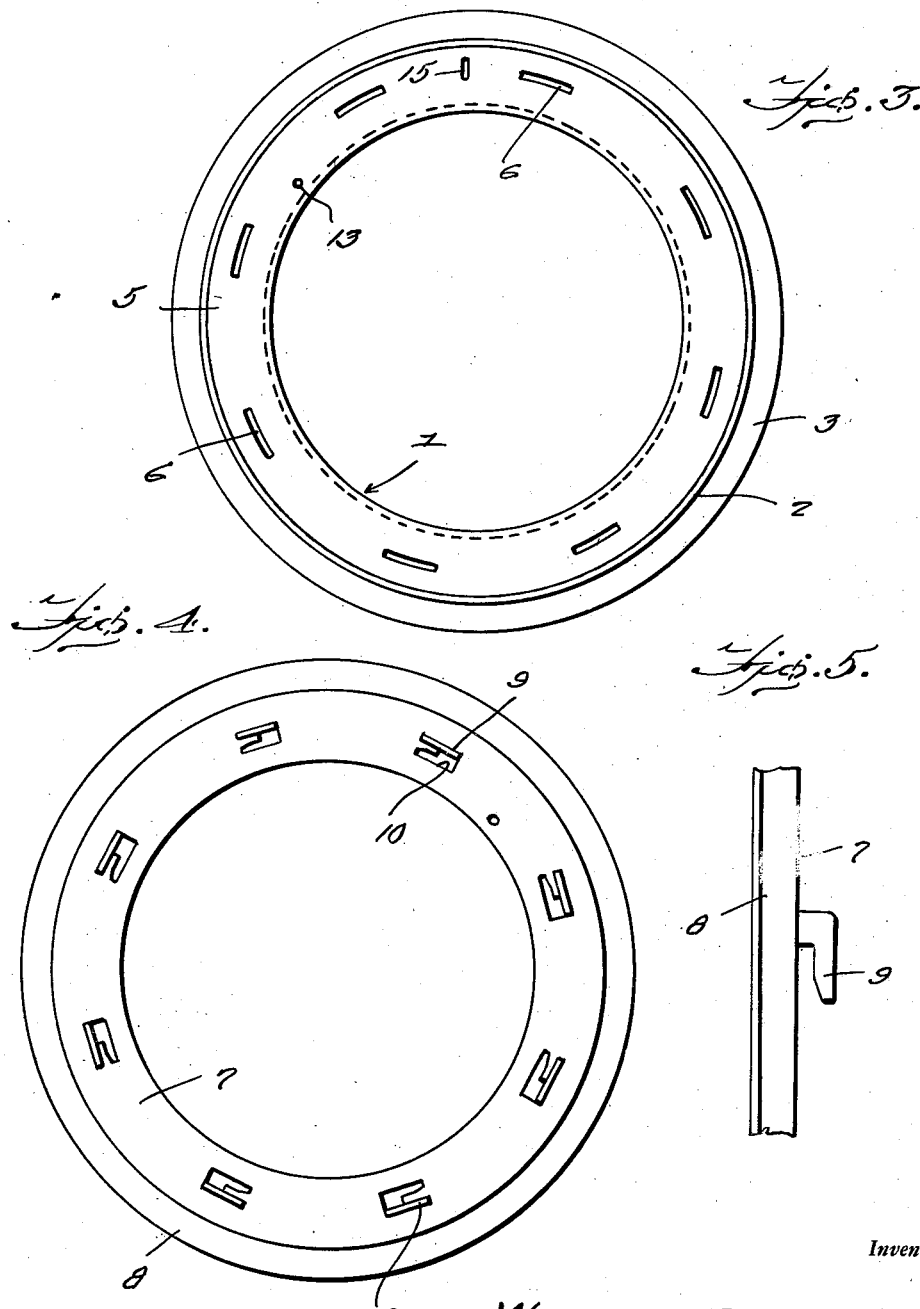

Patented Apr. 23, 1946

2,398,951

UNITED STATES PATENT OFFICE 2,398,951

VEHICLE WHEEL

Warren Lee Moore, Danville, Ky.

Application February 13, 1943, Serial No. 475,825

1 Claim. (Cl. 152—413)

The present invention relates to new and useful improvements in wheels, particularly for motor vehicles, and has for its primary object to provide, in a manner as hereinafter set forth, a device of this character comprising a rim embodying a unique construction and arrangement whereby a pneumatic tire may be expeditiously mounted and removed with a minimum of labor.

Another very important object of the invention is to provide, in a vehicle wheel rim construction of the type including a removable side ring, novel means for rotating said ring in a manner to lock and unlock same.

Other objects of the invention are to provide a vehicle wheel rim which will be comparatively simple in construction, strong, durable, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a rim constructed in accordance with the present invention, showing a pneumatic tire mounted thereon.

Figure 2 is a cross sectional view, taken substantially on the line 2—2 of Figure 1.

Figure 3 is a view in side elevation of the felly.

Figure 4 is an elevational view of the removable side ring, looking at the inner face thereof.

Figure 5 is a fragmentary view of the removable side ring, looking at the periphery thereof.

Figure 6 is a fragmentary view in side elevation of the assembly.

Figure 7 is a perspective view of a portion of the annular cover.

Figure 8 is a view in side elevation of a portion of the felly.

Figure 9 is a cross sectional view through the assembly, showing the method of rotating the removable side ring.

Referring now to the drawings in detail, it will be seen that the embodiment of the invention which has been illustrated comprises a substantially channel-shaped felly 1 of suitable metal. The felly 1 has fixed thereon a rim 2 which is provided with an integral inner side flange 3. The rim 2 is adapted to receive a conventional pneumatic tire 4.

The outer wall 5 of the felly 1 has formed therein a plurality of circumferential slots 6. Removably mounted on the outer side wall 5 of the felly 1 is a side ring 7 which abuts the adjacent edge of the rim 2, said side ring having formed integrally therewith a tire retaining flange 8 which complements the flange 3. Struck inwardly from the side ring 7 is a plurality of horizontal, circumferential hooks 9 which are insertible through the slots 6 and engageable behind the outer side wall 5 of the felly 1 for securing said side ring 7 in position on said felly. The hooks 9 leave openings 10 in the side ring 7.

Mounted on the removable side ring 7 is an annular cover 11 of suitable metal or other material which conceals the openings 10, et cetera. The annular cover plate 11 comprises, on its inner periphery, an inturned flange 12. This is illustrated to advantage in Figure 2 of the drawings.

The outer wall 5 of the felly 1 is tapped, as at 13, to threadedly receive a chrome capped locking bolt 14. The annular cover plate 11 and the removable side ring 7 are provided with smooth, aligned openings for registry with the openings 13 for the passage of the bolt 14 when said side ring 7 is in locked position.

The outer side wall 5 of the felly 1 is further provided with a radial slot 15 (see Figs. 8 and 9). Then, the members 11 and 7 have formed therein circumferential slots 16 which communicate with the slot 15 when said member 7 is properly applied to the felly 1. Inwardly of the slot 16, the members 11 and 7 are further provided with registering openings 17.

In Figure 9 of the drawings, reference character 18 designates generally a rim tool. The tool 18 includes an angular handle 19 having a socket 20 on one end portion thereof. On its other end portion, and projecting in the opposite direction therefrom, the handle 19 is provided with a finger 21. Inwardly of the finger 21, a pin 22 projects from the handle 19.

It is thought that the operation of the invention will be readily apparent from a consideration of the foregoing. Briefly, to mount the pneumatic tire 4, said tire, in a deflated condition, is slipped on the rim 2 against the flange 3. The rim 2 and the felly 1 are provided with a suitable passage to accommodate the usual valve of the inner tube 23. The side ring 7 is then applied to the felly 1, the hooks 9 projecting through the slots 6. This side ring 7 is then rotated in a direction to engage the hooks 9 behind the side wall 5 of the felly 1, thus firmly securing said side ring in position. This is accomplished by engaging the pin 22 of the tool 18 in the openings 17 of the members 11 and 7 and engaging the finger 21 in the communicating slots 16 and 15. The handle 19, functioning as a lever, is then swung in a direction to rotate the side ring 7. When the side ring 7 has thus been rotated as far as it will go, the bolt 14 is inserted and tightened in the opening 13, the socket 20 of the tool 18 being used for this purpose. If desired, the slots 15 and 16 and the openings 17 may be provided at diametrically opposite sides of the assembly to facilitate the use of the tool 18, or, if necessary, to permit the use of two such tools simultaneously.

It is believed that the many advantages of a vehicle wheel rim constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A vehicle wheel of the character described comprising a substantially channel-shaped felly, the outer side wall of the felly having a plurality of circumferential slots therein, a rim, for receiving a pneumatic tire, fixed on the felly, said rim including a tire-retaining flange, a removable side ring rotatably mounted on said outer side wall of the felly, hooks struck inwardly from the removable side ring and engageable behind said outer side wall of the felly through the slots for releasably securing said side ring in position, and a tire-retaining flange on the side ring, the outer side wall of the felly further having a radial slot therein, the side ring having a circumferential slot therein and further having therein an opening inwardly of said slot, the second and third-named slots communicating with each other, said second and third-named slots and opening being for the reception of a tool for rotating the side ring on the felly.

WARREN LEE MOORE.